United States Patent Office 3,265,674
Patented August 9, 1966

3,265,674
COPOLYMER OF POLAR-SUBSTITUTED VINYL SULFIDES AND ALKYL ACRYLATES
Dervin Leo Flowers, Palo Alto, Calif., assignor to Shell Oil Company, New York, N.Y., a corporation of Delaware
No Drawing. Original application Oct. 10, 1960, Ser. No. 61,350, now Patent No. 3,206,400, dated Sept. 14, 1965. Divided and this application Mar. 26, 1965, Ser. No. 443,089
6 Claims. (Cl. 260—79.7)

This patent application is a division of copending patent application Serial No. 61,350, filed October 10, 1960, and which matured into U.S. Patent 3,206,400 on September 14, 1965.

The invention relates to oil-soluble polymeric compound having essentially a long linear hydrocarbon backbone chain and attached thereto in a uniform or random fashion two essential polar-containing groups, one being a sulfur-free ester group represented by —COOR, wherein R is a $C_{8-20}$, preferably $C_{12-20}$, alkyl radical and the other polar group being a thioether-containing group represented by —S—R'—$(Y)_n$ wherein R' is an omega-polar containing $C_{2-18}$ alkyl radical, the polar group (Y) being selected from the group consisting of acidic-polar groups such as halogen, cyano, mercapto, hydroxyl, carboxyl group, and preferably —OH, —SH, —CN and —COOH group and $n$ is at least 1. Polymeric compounds of this type should have a plurality of at least 8 units selected from

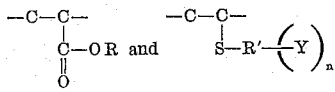

at least two of each such groups, and wherein R, R', Y and $n$ are defined as above and the number of units is such that the molecular weight of the polymer ranges from at least 1,000 to about 2,500,000, preferably from about 10,000 to about 600,000.

The polymeric compounds of the present invention are readily prepared by various means such as by copolymerizing, in the presence of a suitable catalyst such as an azo catalyst, e.g., alpha, alpha'-azo-diisobutyronitrile or an oxygen-yielding catalyst such as various organic peroxides, including aliphatic, aromatic, heterocyclic and acyl peroxides, such as diethyl peroxide, tertiary butyl hydroperoxide, dibenzoyl peroxide, dimethylthienyl peroxide, dicyclohexyl peroxide, dilauroyl peroxide and urea peroxide. These are mentioned by way of nonlimiting examples of suitable organic peroxides. Other catalysts include sodium bisulfite, diethyl sulfoxide, ammonium persulfate, alkali metal perborates, etc.

The sulfur-free polymerizable ester monomer is an ester of an acrylic acid, and an alkanol of from 8 to 20, preferably from 12 to 20 carbon atoms. Representative suitable alcohols are: n-lauryl, n-cetyl, n-stearyl, n-oleyl, and 2,2, 4,4,6,6-hexamethylheptyl alcohols. Examples of suitable esters are n-lauryl acrylate, n-stearyl acrylate, n-lauryl methacrylate, n-cetyl methacrylate, n-stearyl methacrylate, 2,2,4,4-tetramethyl lauryl methacrylate and their mixtures.

The other polymerizable monomer is a vinyl thioether (vinyl sulfide) [$CH_2$=CHS—R'—$(Y)_n$] such as omega-hydroxy or omega-alkoxy, or omega-carboxyl-substituted ethyl, propyl, butyl, amyl, hexyl, octyl, stearyl, phenyl, cyclohexyl, benzyl vinyl sulfides, preferably omega-hydroxyethyl vinyl sulfide, omega-hydroxyoctyl vinyl sulfide, vinyl thioethyl glycidyl ether, omega-carboxyethyl vinyl sulfide and mixtures thereof.

The copolymers are prepared by polymerizing the two monomers in the mol ratio of 1:10 to 10:1, preferably 1:3 to 5:1 of the sulfur-free acrylate ester to the vinyl thioether (vinyl sulfide), respectively. The reaction is carried out in the presence of a polymerization initiator such as an azo or oxygen-yielding catalyst, in an inert solvent and at a temperature ranging from about 60° to about 150° C., preferably between 80° and 125° C. for a period of from 2 to 48 hours, preferably from 8 to 35 hours. The solvents are light liquid hydrocarbons such as benzene, xylene, toluene, light mineral oil, etc.

Various combinations of conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, and nature and amount of the particular monomers. When the polymerization is accomplished in solution, the molecular weight of the product will be lower when the dilution is higher, e.g., when the proportion of solvent is greater. With the same catalyst, the higher polymerization temperature tends to give lower molecular weight polymers.

Under certain extreme conditions the detergent properties of copolymers of the present invention may be further improved and wear inhibition properties imparted thereto, if necessary, by addition to the copolymer, based on the total monomer reactants, of from 5 to 30%, preferably between 10 and 20%, of a polymerizable nitrogen-containing monomer, preferably polymerizable heterocyclic nitrogen-containing monomer which may be exemplified by 2-vinylpyridine, 3-vinylpyridine, 4-vinylpyridine, as well as the ring substituted alkyl derivatives thereof, e.g., 2 - methyl - 5 - vinyl-pyridine, 4 - methyl - 2-vinylpyridine, 5 - ethyl - 2 - vinylpyridine and 2 - butyl - 5 - vinylpyridine, 2-methyl-vinylpyridine and the like.

The following examples illustrate the preparation of suitable polymers for use in oil compositions in accordance with the invention.

*Example I*

A mixture of 5.4 mols of lauryl methacrylate, 3 mols of stearyl methacrylate and 1 mol of hydroxyethyl vinyl sulfide was added to a 50/50 mixture of benzene and light mineral oil diluent and the mixture was reacted in the presence of 0.25% ditertbutyl peroxide at 120° C. for about 24 hours. The copolymer lauryl methacrylate/stearyl methacrylate/hydroxyethyl vinyl sulfide was recovered by precipitation from a benzene-alcohol mixture and had a molecular weight of 400,000–500,000 and a sulfur content of 1.2%. It had good solubility in lubricating oil and imparted thereto detergent and VI improving properties.

*Example II*

A copolymer of stearyl methacrylate and vinyl thioethyl glycidyl ether was prepared by the method of Example I, using the reactant monomers in a molar ratio of 2 to 1, respectively. The molecular weight of the copolymer was around 420,000 and was oil-soluble and exhibited good detergent properties in lubricating oil.

*Example III*

A copolymer of lauryl methacrylate and omega-hydroxy octyl vinyl sulfide was prepared by the method of Example I in which the ratio of the reactants and conditions of the reaction were the same as described in Example I. The polymeric product had a molecular weight of 500,000, a sulfur content of 1.9% and was oil-soluble and exhibited good detergent and wear-inhibiting properties in lubricating oil.

*Example IV*

A copolymer of stearyl methacrylate, lauryl methacrylate and hydroxyethyl vinyl sulfide in the mol ratio of 2:3:1 was prepared by the procedure of Example I, except that the reaction temperature was 100° C. and to the total monomer mixture was added 5% of 2-methyl-5-vinylpyridine. The copolymer was oil-soluble and the molecular weight was around 500,000 and exhibited good detergent properties.

The novel sulfide-containing polymers are effective as anti-wear and detergents in liquid hydrocarbon compositions such as mineral lubricating oil in the range of from about 0.001% to about 10%, preferably from about 0.02% to about 5% by weight. The lubricating stock for this purpose can be any natural or synthetic hydrocarbonaceous material having lubricating properties. Thus, the base may be a hydrocarbon oil within a wide viscosity range, e.g., 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of polybasic organic and inorganic acids, e.g., di-2-ethylhexyl sebacate, dioctyl phthalate, trioctyl phosphate; polymeric tetrahydrofuran; polyalkyl silicone polymers, e.g., dimethyl silicone polymer and the like. In addition, the base can be gasoline, fuel oils or greases.

The outstanding properties of oil compositions of this invention were demonstrated when a mineral lubricating oil containing 2% of additive of Example I (composition A) or 2% of additive of Example II (composition B) were found to have VI values of about 140 as compared to 92 for the neat oil and in the caterpillar L–1 engine test compositions A and B gave clean engines with no evidence of wear or corrosion or sludge formation, whereas a commercial detergent oil containing a metallic detergent (sulfonate) tested under the same engine test conditions resulted in severe corrosion and sludge formation in the engine.

The polymeric sulfides of this invention can be used to improve other types of compositions such as fuel oils, greases, hydraulic fluids of the oil, water-in-oil emulsion, insecticidal compositions, waxes, resins and the like.

I claim as my invention:

1. As a new compound, a copolymer of $C_{8-20}$ alkyl methacrylate and a vinyl sulfide having the formula $CH_2=CHS-R'-Y$ where R' is a $C_{2-18}$ alkyl radical and Y is a polar radical selected from the groups consisting of —OH and —COOH, in the mol ratio of 1:10 to 10:1, respectively, and such that the end product contains at least 8 units selected from the ester and vinyl sulfide units and at least 2 of each group being present in the end product, said copolymer having a molecular weight of from about 1,000 to about 2,500,000.

2. As a new compound, a copolymer of $C_{8-20}$ alkyl methacrylate and a HO—$C_{2-18}$ alkyl vinyl sulfide, in the mol ratio of 1:10 to 10:1, respectively, and such that the end product contains at least 8 units selected from the ester and vinyl sulfide units and at least 2 of each group being present in the end product, said copolymer having a molecular weight of from about 1,000 to about 2,500,000.

3. As a new compound, a copolymer of $C_{8-20}$ alkyl methacrylate and a HOOC—$C_{2-18}$ alkyl vinyl sulfide in the mol ratio of 1:3 to 5:1, respectively, and such that the end product contains at least 8 units selected from the ester and vinyl sulfide unit and at least 2 of each group being present in the end product, said copolymer having a molecular weight from about 10,000 to about 600,000.

4. As a new compound, a copolymer of stearyl methacrylate and hydroxyethyl vinyl sulfide in the mol ratio of 1:3 to 5:1, respectively, and such that the end product contains at least 8 units selected from the ester and vinyl sulfide unit and at least 2 of each group being present in the end product, said copolymer having a molecular weight from about 10,000 to about 600,000.

5. As a new compound, a copolymer of stearyl methacrylate, lauryl methacrylate and hydroxyethyl vinyl sulfide in the mol ratio of 1:3 to 5:1, respectively, and such that the end product contains at least 8 units selected from the ester and vinyl sulfide unit and at least 2 of each group being present in the end product, said copolymer having a molecular weight from about 10,000 to about 600,000.

6. As a new compound, a copolymer of stearyl methacrylate, lauryl methacrylate, 2-methyl-5-vinylpyridine and hydroxyethyl vinyl sulfide in the mol ratio of 1:3 to 5:1, respectively, and such that the end product contains at least 8 units selected from the ester and vinyl sulfide unit and at least 2 of each group being present in the end product, said copolymer having a molecular weight from about 10,000 to about 600,000.

No references cited.

JOSEPH L. SCHOFER, *Primary Examiner.*

D. K. DENENBERG, *Assistant Examiner.*